US010924755B2

(12) United States Patent
Ren et al.

(10) Patent No.: US 10,924,755 B2
(45) Date of Patent: Feb. 16, 2021

(54) REAL TIME END-TO-END LEARNING SYSTEM FOR A HIGH FRAME RATE VIDEO COMPRESSIVE SENSING NETWORK

(71) Applicants: Fengbo Ren, Tempe, AZ (US); Kai Xu, Tempe, AZ (US)

(72) Inventors: Fengbo Ren, Tempe, AZ (US); Kai Xu, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 75 days.

(21) Appl. No.: 16/165,568

(22) Filed: Oct. 19, 2018

(65) Prior Publication Data
US 2019/0124346 A1 Apr. 25, 2019

Related U.S. Application Data

(60) Provisional application No. 62/574,546, filed on Oct. 19, 2017.

(51) Int. Cl.
H04N 19/503 (2014.01)
G06T 7/246 (2017.01)
(Continued)

(52) U.S. Cl.
CPC ......... H04N 19/503 (2014.11); G06N 3/0445 (2013.01); G06N 3/0454 (2013.01);
(Continued)

(58) Field of Classification Search
CPC .... H04N 19/503; H04N 19/135; H04N 19/51; G06N 3/0445; G06N 3/0454
See application file for complete search history.

(56) References Cited

U.S. PATENT DOCUMENTS 9,654,752 B2    5/2017  Baraniuk et al.
2008/0137753 A1*  6/2008  He ................. H04N 19/174
                                                       375/240.24
(Continued)

OTHER PUBLICATIONS

T. Chen, H. Liu, Q. Shen, T. Yue, X. Cao and Z. Ma, "DeepCoder: A deep neural network based video compression," 2017 IEEE Visual Communications and Image Processing (VCIP), St. Petersburg, FL, 2017, pp. 1-4. (Year: 2017).*

(Continued)

Primary Examiner — Jeremiah C Hallenbeck-Huber
(74) Attorney, Agent, or Firm — Withrow & Terranova, P.L.L.C.

(57) ABSTRACT

A real time end-to-end learning system for a high frame rate video compressive sensing network is described. The slow reconstruction speed of conventional compressive sensing approaches is overcome by directly modeling an inverse mapping from compressed domain to original domain in a single forward propagation. Through processing massive unlabeled video data such a mapping is learned by a neural network using data-driven methods. Systems and methods according to this disclosure incorporate a multi-rate convolutional neural network (CNN) and a synthesizing recurrent neural network (RNN) to achieve real time compression and reconstruction of video data.

20 Claims, 8 Drawing Sheets

(51) Int. Cl.
| | |
|---|---|
| H04N 19/146 | (2014.01) |
| G06N 3/08 | (2006.01) |
| H04N 19/105 | (2014.01) |
| H04N 19/172 | (2014.01) |
| G06N 3/04 | (2006.01) |
| H04N 19/51 | (2014.01) |
| H04N 19/137 | (2014.01) |
| G06T 7/277 | (2017.01) |
| G06N 7/00 | (2006.01) |

(52) U.S. Cl.
CPC .............. *G06N 3/08* (2013.01); *G06T 7/246* (2017.01); *H04N 19/105* (2014.11); *H04N 19/137* (2014.11); *H04N 19/146* (2014.11); *H04N 19/172* (2014.11); *H04N 19/51* (2014.11); *G06N 3/0481* (2013.01); *G06N 7/005* (2013.01); *G06T 7/277* (2017.01); *G06T 2207/10016* (2013.01); *G06T 2207/20081* (2013.01); *G06T 2207/20084* (2013.01)

(56) References Cited

U.S. PATENT DOCUMENTS

| | | | |
|---|---|---|---|
| 2008/0216116 A1* | 9/2008 | Pekonen | H04N 21/23614 725/39 |
| 2010/0272184 A1* | 10/2010 | Fishbain | G06T 3/4069 375/240.16 |
| 2019/0251360 A1* | 8/2019 | Cricri | G06K 9/00664 |
| 2019/0318227 A1* | 10/2019 | Bronstein | G06N 3/0454 |

OTHER PUBLICATIONS

G. Toderici, D. Vincent, N Johnston, S. J. Hwang, D. Minnen, J. Shor, M. Covell; "Full Resolution Image Compression with Recurrent Neural Networks"; Jul. 2017; available at https://arxiv.org/abs/1608.05148 (Year: 2017).*

P. Pan, Z. Xu, Y. Yang, F. Wu, Y. Zhuang; "Hierarchical Recurrent Neral Encoder for Video Representation with Application to Captioning"; Nov. 2015; available at https://arxiv.org/abs/1511.03476 (Year: 2015).*

Z. Zuo et al., "Learning Contextual Dependence With Convolutional Hierarchical Recurrent Neural Networks," in IEEE Transactions on Image Processing, vol. 25, No. 7, pp. 2983-2996, Jul. 2016. (Year: 2016).*

Kin, Cedric Yue Sik. "Video Compression Using Recurrent Convolutional Neural Networks." (2017). (Year: 2017).*

Iliadis, M. et al., "Deep fully-connected networks for video compressive sensing," Digital Signal Processing, vol. 72, Jan. 2018, Elsevier Inc., pp. 9-18.

Metzler, C.A. et al., "From Denoising to Compressed Sensing," IEEE Transactions on Information Theory, vol. 62, No. 9, Sep. 2016, IEEE, pp. 5117-5144.

Arbeláez, P. et al., "Contour Detection and Hierarchical Image Segmentation," IEEE Transactions on Pattern Analysis and Machine Intelligence, vol. 33, No. 5, May 2011, IEEE, pp. 898-916.

Beck, A. et al., "A Fast Iterative Shrinkage-Thresholding Algorithm for Linear Inverse Problems," SIAM Journal on Imaging Sciences, vol. 2, Issue 1, 2009, Society for Industrial and Applied Mathematics, pp. 183-202.

Becker, S. et al., "NESTA: A Fast and Accurate First-Order Method for Sparse Recovery," SIAM Journal on Imaging Sciences, vol. 4, No. 1, 2011, Society for Industrial and Applied Mathematics, 39 pages.

Bevilacqua, M. et al., "Low-Complexity Single-Image Super-Resolution based on Nonnegative Neighbor Embedding," British Machine Vision Conference (BMVC), 2012, pp. 135-1-135.10.

Blumensath, T. et al., "Iterative hard thresholding for compressed sensing," Applied and Computational Harmonic Analysis, vol. 27, Issue 3, 2009, Elsevier Inc., pp. 265-274.

Bora, A. et al., "Compressed Sensing using Generative Models," Proceedings of the 34th International Conference on Machine Learning, PMLR 70, 2017, Sydney, Australia, 10 pages.

Candès, E. et al., "Compressed sensing with coherent and redundant dictionaries," Applied and Computational Harmonic Analysis, vol. 31, Issue 1, 2011, Elsevier Inc., pp. 59-73.

Candès, E. et al., "Robust Uncertainty Principles: Exact Signal Reconstruction From Highly Incomplete Frequency Information," IEEE Transactions on Information Theory, vol. 52, No. 2, Feb. 2006, IEEE, pp. 489-509.

Candès, E. et al., "Stable Signal Recovery from Incomplete and Inaccurate Measurements," Communications on Pure and Applied Mathematics, vol. 59, Issue 8, Wiley Periodicals, Inc., 17 pages.

Cui, Z. et al., "Deep Neural Cascade for Image Super-resolution," In Fleet, D. et al., ECCV 2014, Part V, LNCS 8693, Springer International Publishing, pp. 49-64.

Dabov, K. et al., "Image Denoising by Sparse 3-D Transform-Domain Collaborative Filtering," IEEE Transactions on Image Processing, vol. 16, No. 8, Aug. 2007, IEEE, pp. 2080-2095.

Daubechies, I. et al., "Iteratively Reweighted Least Squares Minimization for Sparse Recovery," Communications on Pure and Applied Mathematics, vol. LXIII, 0001-0038, 2010, Wiley Periodicals, Inc., 38 pages.

Davenport, M.A., "Random Observations on Random Observations: Sparse Signal Acquisition and Processing," A Thesis Submitted in Partial Fulfillment of the Requirements for the Degree of Doctor of Philosophy, Aug. 2010, Rice University, Houston, Texas, 203 pages.

Davisson, L.D., "Book Reviews: 'Rate Distortion Theory: A Mathematical Basis for Data Compression,'" IEEE Transactions on Communications, vol. 20, No. 6, Dec. 1972, IEEE, p. 1202.

Denton, E. et al., "Deep Generative Image Models using a Laplacian Pyramid of Adversarial Networks," Advances in Neural Information Processing Systems 28 (NIPS 2015), Proceedings of the 29th Conference on Neural Information Processing Systems (NIPS), Dec. 2015, Montreal, Canada, 9 pages.

Donahue, J. et al., "Long-term Recurrent Convolutional Networks for Visual Recognition and Description," IEEE Conference on Computer Vision and Pattern Recognition (CVPR), Jun. 7-12, 2015, Boston, MA, USA, IEEE, 10 pages.

Dong, C. et al., "Image Super-Resolution Using Deep Convolutional Networks," IEEE Transactions on Pattern Analysis and Machine Intelligence, Jun. 2015, IEEE, 14 pages.

Dong, C. et al., "Learning a Deep Convolutional Network for Image Super-Resolution," In Fleet, D. et al., ECCV 2014, Part IV, LNCS 8692, 2014, Springer International Publishing, pp. 184-199.

Dong, W. et al., "Compressive Sensing via Nonlocal Low-Rank Regularization," IEEE Transactions on Image Processing, vol. 23, No. 8, Aug. 2014, IEEE, pp. 3618-3632.

Duarte, M.F. et al., "Single-Pixel Imaging via Compressive Sampling," IEEE Signal Processing Magazine, Mar. 2008, IEEE, pp. 83-91.

Duchi, J. et al., "Adaptive Subgradient Methods for Online Learning and Stochastic Optimization," Journal of Machine Learning Research, vol. 12, Jul. 2011, pp. 2121-2159.

Fowler, J.E. et al., "Block-Based Compressed Sensing of Images and Video," Foundations and Trends in Signal Processing, vol. 4, No. 4, 2012, pp. 297-416.

Glasner, D. et al., "Super-Resolution from a Single Image," IEEE 12th International Conference on Computer Vision (ICCV), Sep. 29-Oct. 2, 2009, Kyoto, Japan, IEEE, pp. 349-356.

Guo, W. et al., "EdgeCS: Edge Guided Compressive Sensing Reconstruction," Proceedings of SPIE Visual Communications and Image Processing 2010, vol. 7744, 77440L-1, Jul. 2010, Huangshan, China, SPIE, 10 pages.

He, K. et al., "Deep Residual Learning for Image Recognition," 2016 IEEE Conference on Computer Vision and Pattern Recognition (CVPR), Jun. 27-30, 2016, Las Vegas, NV, USA, IEEE, pp. 770-778.

Huggins, P.S. et al., "Greedy Basis Pursuit," IEEE Transactions on Signal Processing, vol. 55, No. 7, Jul. 2007, IEEE, pp. 3760-3772.

Iliadis, M. et al., "Deep fully-connected networks for video compressive sensing," arXiv: 1603.04930v2, Dec. 16, 2017, 14 pages.

(56) References Cited

OTHER PUBLICATIONS

Ioffe, S. et al., "Batch Normalization: Accelerating Deep Network Training by Reducing Internal Covariate Shift," Proceedings of the 32nd International Conference on Machine Learning, 2015, Lille, France, 9 pages.
Kim, J. et al., "Accurate Image Super-Resolution Using Very Deep Convolutional Networks," 2016 IEEE Conference on Computer Vision and Pattern Recognition (CVPR), Jun. 27-30, 2016, Las Vegas, NV, USA, IEEE, pp. 1646-1654.
Kingma, D. et al., "Adam: A Method for Stochastic Optimization," arXiv: 1412.6980v9, Jan. 30, 2017, published as a conference paper at ICLR 2015, 15 pages.
Kulkarni, K. et al., "ReconNet: Non-Iterative Reconstruction of Images from Compressively Sensed Measurements," 2016 IEEE Conference on Computer Vision and Pattern Recognition (CVPR), Jun. 2016, IEEE, 10 pages.
Lai, W.S. et al., "Deep Laplacian Pyramid Networks for Fast and Accurate Super-Resolution," 2017 IEEE Conference on Computer Vision and Pattern Recognition (CVPR), Jul. 21-26, 2017, Honolulu, HI, USA, IEEE, pp. 5835-5843.
Lecun, Y. et al., "Efficient BackProp," In Montavon, G. et al., Neural Networks: Tricks of the Trade, 2nd edition, LNCS 7700, 2012, Springer-Verlag, pp. 9-48.
Li, C. et al., ""An efficient augmented Lagrangian methodwith applications to total variation minimization,"" Computational Optimization and Applications, vol. 56, Issue 3, Dec. 2013, Springer Science+Business Media, 24 pages.
Li, D. et al., "DeepRebirth: Accelerating Deep Neural Network Execution on Mobile Devices," The Thirty-Second AAAI Conference on Artificial Intelligence (AAAI-18), 2018, Association for the Advancement of Artificial Intelligence, pp. 2322-2330.
Ma, S. et al., "An Efficient Algorithm for Compressed MR Imaging using Total Variation and Wavelets," IEEE Conference on Computer Vision and Pattern Recognition (CVPR), Jun. 23-28, 2008, Anchorage, AK, USA, 8 pages.
Metzler, C.A., "From Denoising to Compressed Sensing," arXiv: 1406.4175v5, Apr. 17, 2016, 29 pages.
METZLER, C.A., "Learned D-AMP: Principled Neural Network Based Compressive Image Recovery," 31st Conference on Neural Information Processing Systems (NIPS 2017), Dec. 4-9, 2017, Long Beach, CA, USA, 12 pages.
Mousavi, A. et al., "A Deep Learning Approach to Structured Signal Recovery," arXiv: 1508.04065v1, Aug. 17, 2015, 8 pages.
Mousavi, A. et al., "Learning to Invert: Signal Recovery via Deep Convolutional Networks," 2017 IEEE International Conference on Acoustics, Speech and Signal Processing (ICASSP), Mar. 5-9, 2017, New Orleans, LA, USA, IEEE, pp. 2272-2276.
Nam, S. et al., "The cosparse analysis model and algorithms," Applied and Computational Harmonic Analysis, vol. 34, Issue 1, Jan. 2013, Elsevier Inc., pp. 30-56.
Pathak, D. et al., "Context Encoders: Feature Learning by Inpainting," 2016 IEEE Conference on Computer Vision and Pattern Recognition (CVPR), Jun. 27-30, 2016, Las Vegas, NV, USA, IEEE, pp. 2536-2544.
Needell, D. et al., "CoSaMP: Iterative Signal Recovery from Incomplete and Inaccurate Samples," Communications of the ACM, vol. 53, No. 12, Dec. 2010, pp. 93-100.
Noh, H. et al., "Learning Deconvolution Network for Semantic Segmentation," IEEE International Conference on Computer Vision (ICCV), 2015, IEEE, pp. 1520-1528.
Radford, A. et al., "Unsupervised Representation Learning with Deep Convolutional Generative Adversarial Networks," arXiv: 1511. 06434v2, Jan. 7, 2016, 16 pages.
Sankaranarayanan, A. et al., "Compressive Acquisition of Linear Dynamical Systems," SIAM Journal on Imaging Sciences, vol. 6, No. 4, 2013, Society for Industrial and Applied Mathematics, pp. 2109-2133.
Sankaranarayanan, A. et al., "Video Compressive Sensing for Spatial Multiplexing Cameras Using Motion-Flow Models," SIAM Journal on Imaging Sciences, vol. 8, No. 3, 2015, Society for Industrial and Applied Mathematics, pp. 1489-1518.
Schulter, S. et al., "Fast and Accurate Image Upscaling with Super-Resolution Forests," 2015 IEEE Conference on Computer Vision and Pattern Recognition (CVPR), Jun. 7-12, 2015, Boston, MA, USA, IEEE, pp. 3791-3799.
Snoek, C. et al., "Early versus Late Fusion in Semantic Video Analysis," Proceedings of the 13th ACM International Conference on Multimedia (MM), Nov. 6-11, 2005, Singapore, ACM, 4 pages.
Soomro, K. et al., "UCF101: A Dataset of 101 Human Actions Classes From Videos in the Wild," CRCV-TR-12-01, Nov. 2012, Center for Research in Computer Vision, University of Central Florida, USA, 7 pages.
Srivastava, N. et al., "Unsupervised Learning of Video Representations using LSTMs," Proceedings of the 32nd International Conference on Machine Learning (ICML), 2015, Lille, France, 10 pages.
Tropp, J. et al., "Signal Recovery From Random Measurements Via Orthogonal Matching Pursuit," IEEE Transactions on Information Theory, vol. 53, No. 12, Dec. 2007, IEEE, pp. 4655-4666.
Venugopalan, S. et al., "Sequence to Sequence—Video to Text," IEEE International Conference on Computer Vision (ICCV), Dec. 11-18, 2015, Santiago, Chile, IEEE, pp. 4534-4542.
Wang, Z. et al., "Image Quality Assessment: From Error Visibility to Structural Similarity," IEEE Transactions on Image Processing, vol. 13, No. 4, Apr. 2004, IEEE, 14 pages.
Xu, K. et al., "A Data-Driven Compressive Sensing Framework Tailored for Energy-Efficient Wearable Sensing," The 42nd IEEE International Conference on Acoustics, Speech and Signal Processing (ICASSP), Mar. 2017, IEEE, 6 pages.
Xu, K. et al., "Show, Attend and Tell: Neural Image Caption Generation with Visual Attention," Proceedings of the 32nd International Conference on Machine Learning, 2015, Lille, France, 10 pages.
Yang, J. et al., "Image Super-Resolution via Sparse Representation," IEEE Transactions on Image Processing, vol. 19, No. 11, Nov. 2010, IEEE, pp. 2861-2873.
Yang, J. et al., "Video Compressive Sensing Using Gaussian Mixture Models," IEEE Transactions on Image Processing, vol. 23, No. 11, Nov. 2014, pp. 4863-4878.
Zeiler, M. et al. "Adaptive Deconvolutional Networks for Mid and High Level Feature Learning," 2011 IEEE International Conference on Computer Vision (ICCV), Nov. 6-13, 2011, Barcelona, Spain, IEEE, 8 pages.
Zeiler, M. et al., "Visualizing and Understanding Convolutional Networks," In Fleet et al., ECCV 2014, Part I, LNCS 8689, Springer International Publishing, pp. 818-833.
Zeyde, R.et al., "On Single Image Scale-Up Using Sparse-Representations," In Boissonnat, J.D. et al., Curves and Surfaces 2011, LNCS 6920, 2012, Springer-Verlag, pp. 711-730.
Badrinarayanan, V. et al., "SegNet: A Deep Convolutional Encoder-Decoder Architecture for Image Segmentation", arXiv, (v1, submitted Nov. 2, 2015), 14 pages, arXiv:1511.00561v1.
Badrinarayanan, V. et al., "SegNet: A Deep Convolutional Encoder-Decoder Architecture for Image Segmentation", arXiv, v2, submitted Dec. 8, 2015), 14 pages, arXiv:1511.00561v2.
Bahdanau, D. et al., "Neural Machine Translation by Jointly Learning to Algin and Translate", arXiv, (v3, submitted Oct. 7, 2014), 15 pages, arXiv:1409.0473v3.
Bahdanau, D. et al., "Neural Machine Translation by Jointly Learning to Algin and Translate", arXiv, (v4, submitted Dec. 19, 2014), 15 pages, arXiv:1409.0473v4.
Bahdanau, D. et al., "Neural Machine Translation by Jointly Learning to Align and Translate", arXiv, (v1, submitted Sep. 1, 2014), 15 pages, arXiv:1409.0473v1.
Bahdanau, D. et al., "Neural Machine Translation by Jointly Learning to Align and Translate", arXiv, (v2, submitted Sep. 2, 2014), 15 pages, arXiv:1409.0473v2.
Becker, S. et al., "Templates for convex cone problems with applications to sparse signal recovery", Mathematical Programming Computation volume, Jul. 2011, vol. 3, pp. 165-218 <DOI:10.1007/s12532-011-0029-5>.

(56) References Cited

OTHER PUBLICATIONS

Burger, H. et al., "Image Denoising: Can Plain Neural Networks Compete with BM3D", 2012 IEEE Conference on Computer Vision and Machine Learning (Providence, RI, Jun. 16-21, 2012), 2012 [Date Added to IEEE Xplore Jul. 2012], pp. 2392-2399 <DOI:10.1109/CVPR.2012.6247952>.

Candes, E., "The restricted isometry property and its implications for compressed sensing", Comptes Rendus Mathematique, May 2008 (available online Apr. 2008), vol. 346, No. 9-10, pp. 589-592 <DOI:10.1016/j.crma.2008.03.014>.

Chen, X. et al., "Mind's eye: A recurrent visual representation for image caption generation", 2015 IEEE Conference on Computer Vision and Pattern Recognition (CVPR) (Boston, MA, Jun. 7-12, 2015), 2015 [Date Added to IEEE Xplore: Oct. 2015], pp. 2422-2431 <DOI:10.1109/CVPR.2015.7298856>.

Cho, K. et al., "Learning Phase Representations using RNN Encoder-Decoder for Statistical Machine Translation", arXiv, (v1, submitted Jun. 3, 2014), 14 pages, arXiv:1406.1078v1.

Cho, K. et al., "Learning Phase Representations using RNN Encoder-Decoder for Statistical Machine Translation", arXiv, (v2, submitted Jul. 24, 2014), 15 pages, arXiv:1406.1078v2.

Cho, K. et al., "Learning Phase Representations using RNN Encoder-Decoder for Statistical Machine Translation", arXiv, (v3, submitted Sep. 3, 2014), 15 pages, arXiv:1406.1078v3.

Girshick, R. et al., "Rich Feature Hierarchies for Accurate Object Detection and Semantic Segmentation", 2014 IEEE Conference on Computer Vision and Pattern Recognition (Columbus, OH, Jun. 23-28, 2014), 2014 [Date Added to IEEE Xplore Sep. 2014], pp. 580-587 <DOI:10.1109/CVPR.2014.81>.

Graves, A. et al., "Towards End-to-End Speech Recognition with Recurrent Neural Networks", ICML '14: Proceedings of the 31st International Conference on Machine Learning (Beijing, China, Jun. 22-24, 2014), 2014, vol. 32, 9 pages.

Hinton, G. et al., "Deep Neural Networks for Acoustic Modeling in Speech Recognition: The Shared Views of Four Research Groups", IEEE Signal Processing Magazine, Nov. 2012 (Date of Publication Oct. 2012), vol. 29, No. 6, pp. 82-97 <DOI:10.1109/MSP.2012.2205597>.

Hinton, G. et al., "Reducing the Dimensionality of Data with Neural Networks", Science, Jul. 2006, vol. 313, No. 5786, pp. 504-507 <DOI:10.1126/science.1127647>.

Iliadis, M. et al., "Deep Fully-Connected Networks for Video Compressive Sensing", arXiv, (v1, submitted Mar. 16, 2016), 13 pages, arXiv:1603.04930v1.

Karpathy, A. et al., "Large-Scale Video Classification with Convolutional Neural Networks", 2014 IEEE Conference on Computer Vision and Patter Recognition (Columbus, OH, Jun. 23-28, 2014), 2014 [Date Added to IEEE Xplore: Sep. 2014], pp. 1725-1732 <DOI:10.1109/CVPR.2014.223>.

Krizhevsky, A. et al., "ImageNet Classification with Deep Convolutional Neural Networks", Advances in Neural Information Processing Systems (NIPS 2012), 2012, vol. 25, 9 pages.

Li, D. et al., "DeepRebirth: Accelerating Deep Neural Network Execution on Mobile Devices", arXiv, (v1, submitted Aug. 16, 2017), 9 pages, https://arxiv.org/abs/1708.04728v1.

Long, J. et al., "Fully Convolutional Networks for Semantic Segmentation", arXiv, (v1, submitted Nov. 14, 2014), 10 pages, arXiv:1411.4038v1.

Long, J. et al., "Fully Convolutional Networks for Semantic Segmentation", arXiv, (v2, submitted Mar. 8, 2015), 10 pages, arXiv:1411.4038.

Ma, S. et al., "Learning Activity Progression in LSTMs for Activity Detection and Early Detection", 2016 IEEE Conference on Computer Vision and Pattern Recognition (Las Vegas, NV, Jun. 27-30, 2016), 2016 [Date Added to IEEE Xplore: Dec. 2016], pp. 1942-1950 <DOI:10.1109/CVPR.2016.214>.

Mun, S. et al., "Motion-Compensated Compressed-Sensing Reconstruction for Dynamic MRI", 2013 IEEE International Conference on Image Processing (Melbourne, Australia, Sep. 15-18, 2013), 2013 [Date Added to IEEE Xplore: Feb. 2014], pp. 1006-1010 <DOI:10.1109/ICIP.2013.6738208>.

Ng, J. et al., "Beyong Short Snippets: Deep Networks for Video Classification", 2015 IEEE Conference on Computer Vision on Pattern Recognition (Boston, MA, Jun. 7-12, 2015), 2015 [Date Added to IEEE Xplore: Oct. 2015], pp. 4694-4702 <DOI:10.1109/CVPR.2015.7299101>.

Noh, H. et al., "Image Question Answering Using Convolutional Neural Network with Dynamic Parameter Prediction", 2016 IEEE Conference on Computer Vision and Pattern Recognition (Las Vegas, NV, Jun. 27-30, 2016), 2016 [Date Added to IEEE Xplore: Dec. 2016], pp. 30-38 <DOI:10.1109/CVPR.2016.11>.

Oquab, M. et al., Is Object Localization for Free?—Weakly-Supervised Learning with Convolutional Neural Networks, 2015 IEEE Conference on Computer Vision and Pattern Recognition (Boston, MA, Jun. 7-12, 2015), 2015 [Date Added to IEEE Xplore: Oct. 2015], pp. 685-694 <DOI:10.1109/CVPR.2015.7298668>.

Qaisar, S. et al., "Compressive Sensing: From Theory to Applications, a Survey", Journal of Communications and Networks, Oct. 2013 (Date of Publication Nov. 2013), vol. 15, No. 5, pp. 443-456 <DOI:10.1109/JCN.2013.000083>.

Sankaranarayanan, A. et al., "CS-MUVI: Video Compressive Sensing for Spatial-Multiplexing Cameras", 2012 IEEE International Conference on Computational Photography (Seattle, WA, Apr. 28-29, 2012), 2012 [Date Added to IEEE Xplore: Jun. 2012], 10 pages <DOI:10.1109/ICCPhot.2012.6215212>.

Sharma, S. et al., "Action Recognition using Visual Attention", arXiv, (v1, submitted Nov. 12, 2015), 11 pages, arXiv:1511.04119v1.

Xie, J. et al., "Image Denoising and Inpainting with Deep Neural Networks", Advances in Neural Information Processing Systems (NIPS 2012), 2012, vol. 25, 9 pages.

Xu, K. et al., "An energy-efficient compressive sensing framework incorporating online dictionary learning for long-term wireless health monitoring", 2016 IEEE International Conference on Acoustics, Speech and Signal Processing (ICASSP) (Shanghai, China, Mar. 20-25, 2016), 2016 [Date Added to IEEE Xplore: May 2016], pp. 804-808 <DOI:10.1109/ICASSP.2016.7471786>.

Yang, Z. et al., "Stacked Attention Networks for Image Question Answering", 2016 IEEE Conference on Computer Vision and Pattern Recognition (Las Vegas, NV, Jun. 27-30, 2016), 2016 [Date Added to IEEE Xplore: Dec. 2016], pp. 21-29 <DOI:10.1109/CVPR.2016.10>.

U.S. Appl. No. 16/745,817, Ren et al., filed Jan. 17, 2020.

* cited by examiner

REAL TIME END-TO-END LEARNING SYSTEM FOR A HIGH FRAME RATE VIDEO COMPRESSIVE SENSING NETWORK

RELATED APPLICATIONS

This application claims the benefit of provisional patent application Ser. No. 62/574,546, filed Oct. 19, 2017, the disclosure of which is hereby incorporated herein by reference in its entirety.

This invention was made with government support under 1652038 awarded by the National Science Foundation. The government has certain rights in the invention.

FIELD OF THE DISCLOSURE

This disclosure relates to data compression for high frame rate image and/or video applications.

BACKGROUND

High frame rate cameras are capable of capturing images and/or videos at frame rates over 100 frames per second (fps). These devices were originally developed for research purposes, such as to characterize events (e.g., in physical and biological sciences) which occur at speeds which are higher than a traditional camera is capable of recording. Some high frame rate cameras are capable of recording high resolution still images of ephemeral events such as a supersonic flying bullet or an exploding balloon with negligible motion blur and image distortion artifacts. However, due to the complex sensor hardware designed for high sampling frequency, these types of equipment are extremely expensive. The high cost (over tens of thousand dollars for one camera) limits the field of their applications.

Furthermore, high frame rate cameras require high transmission bandwidth and large storage space, which presents a challenge for the manufacture of affordable consumer devices. For example, true high-definition-resolution (1080p) video cameras at a frame rate of 10,000 fps can generate about 500 GB of data per second, imposing significant challenges for existing transmission and storing techniques. In addition, the high throughput raises a significant concern for energy efficiency. For example, the high throughput shortens the battery life of portable devices, significantly narrowing the practical implementation of high frame rate mobile cameras.

A traditional video encoder, such as H.264/MPEG-4, is composed of motion estimation, frequency transform, quantization, and entropy coding modules. From both speed and cost perspectives, the complicated encoding structure makes these traditional video encoders unsuitable for high frame rate video cameras. Alternatively, compressive sensing (CS) is a more hardware-friendly acquisition technique that allows video capture with a sub-Nyquist sampling rate. The advent of CS has led to the emergence of new image devices, such as single-pixel cameras. CS has also been applied in many practical applications, such as accelerating magnetic resonance imaging (MRI). While traditional signal acquisition methods follow a sample-then-compress procedure, CS can perform compression together with sampling. The CS acquisition strategy has enabled low-cost on-sensor data compression, relieving the pain for high transmission bandwidth and large storage space.

Recently, many algorithms have been proposed to solve image and/or video reconstruction under CS. Generally, these reconstruction algorithms are based on either optimization or greedy approaches using signal sparsity as the prior knowledge. As a result, the previously proposed solutions suffer from high computational complexity, requiring seconds to minutes to recover an image, depending on the resolution.

An example recovery algorithm proposed for CS reconstruction is Conventional Model-based CS Recovery. Under this approach, the evolution of scenes is modeled as a linear dynamical system (LDS). The model comprises two sub-models: the first is an observation model that models frames of video lying on a low-dimensional subspace; the second predicts the smoothly varied trajectory. The model performs well in stationary scenes, but is inadequate for non-stationary scenes.

Another approach uses a Gaussian mixture model (GMM) to recover high frame rate videos, and the reconstruction can be efficiently computed as an analytical solution. The hallmark of the algorithm is that it adapts a temporal compression rate based upon the complexity of the scene. The parameters in GMM are trained offline and tuned during the recovery process.

Another approach proposes a multi-scale video recovery framework. This method first obtains a low-resolution video preview with very low computational complexity, and then exploits motion estimates to recover the full-resolution video using an optimization algorithm. Similarly, a motion-compensated and block-based CS with smooth projected Landweber (MC-BCS-SPL) reconstruction algorithm has been proposed, which estimates a motion vector from a reference and a reconstructed frame. The reconstructed video is derived by the combination of the low-resolution video and the motion vector. The drawback of these two approaches is the need to specify the resolution at which the preview frame is recovered, which requires prior knowledge of object speed within the video. In addition, the recovery performance is highly dependent on the quality of the motion estimation, which is difficult to obtain accurately. Furthermore, the explicit motion estimation has a high runtime cost which makes this model inadequate for reconstructing high frame-rate videos.

Another approach uses Neural Network Based CS Recovery. This approach proposes a stacked auto encoder to learn a representation of training data and to recover test data from sub-sampled measurements. Compared to the conventional iterative approaches, which usually need hundreds of iterations to converge, the approach uses a feed-forward deep neural network to run faster in the inference stage.

Still another approach proposes a convolutional neural network (CNN), which takes CS measurements of an image as input and outputs an intermediate reconstruction. The intermediate output is fed into an off-the-shelf denoiser to obtain the final reconstructed image. This work shows the network is highly robust to sensor noise and can recover visually higher quality images than competitive algorithms at low compression ratios (CRs) of 10 and 25. Both approaches are designed for image reconstruction, which only focus on spatial feature extraction. For video applications, temporal features between adjacent frames are also important. Therefore, the overlook of temporal correlation makes the image reconstruction algorithms inadequate for video applications.

Another approach proposes a Video CS reconstruction algorithm based on a fully-connected neural network. This approach focuses on temporal CS where multiplexing occurs across the time dimension. A three-dimensional (3D) volume is reconstructed from two-dimensional (2D) measurements by a feed-forward process. This approach claims the reconstruction time for each frame can be reduced to about one second. The major drawback of this approach is that the algorithm is based on a plain fully-connected neural network, which is not efficient in extracting temporal features.

The above sparsity-based methods cannot satisfy the real-time decoding need of high frame rate cameras, and they are not appropriate for high frame rate video CS applications.

SUMMARY

Embodiments of the present disclosure relate to a real time end-to-end learning system for a high frame rate video compressive sensing network. In this regard, the slow reconstruction speed of conventional compressive sensing (CS) approaches is overcome by embodiments of the disclosure by directly modeling an inverse mapping from compressed domain to original domain. Usually, this mapping would be complicated and difficult to model. However, through processing massive unlabeled video data such a mapping can be learned by a neural network using data-driven methods. Systems and methods according to this disclosure incorporate an enhanced recurrent convolutional neural network (RCNN) to solve this problem. RCNN has shown astonishingly good performance for video recognition and description. However, conventional RCNNs are not well suited for CS video applications, since they are mostly designed to extract discriminant features for classification related tasks. Simultaneously improving compression ratio (CR) and preserving visual details for high-fidelity reconstruction is a more challenging task.

Embodiments disclosed herein incorporate a special RCNN to extract spatial-temporal features to significantly improve the compression ratio and recovery quality trade-off for video CS application over existing approaches. Example spatial-temporal features which may be extracted include background, object details, and motions. A real-time end-to-end learning system for high frame rate video compressive sensing network (referred to herein as CSVideoNet) is described herein. CSVideoNet includes a non-iterative model that directly learns the inverse mapping of video data which is compressed, transmitted to a destination, and then reconstructed into near-original video data in a single forward propagation. A multi-rate convolutional neural network (CNN) and a synthesizing recurrent neural network (RNN) are used to improve the trade-off between CR and spatial-temporal resolution of the reconstructed videos.

In an exemplary aspect, a method for reconstructing compressed video data is provided. The method includes receiving compressed reference video data based on a reference frame and receiving compressed remaining video data based on a set of remaining frames. The method also includes reconstructing the reference frame from the compressed reference video data using a reference CNN. The method also includes training a synthesizing RNN using output data from the reference CNN. The method also includes reconstructing the set of remaining frames from the compressed remaining video data using a remaining CNN and the synthesizing RNN.

Another exemplary aspect relates to a video reconstruction network. The video reconstruction network includes a reference CNN adapted to reconstruct a reference frame from compressed reference video data and a remaining CNN adapted to partially reconstruct a set of remaining frames from compressed remaining video data. The video reconstruction network also includes a synthesizing RNN adapted to enhance the set of remaining frames partially reconstructed by the remaining CNN.

Another exemplary aspect relates to a video processing system. The system includes a compression decoder. The compression decoder includes a reference CNN adapted to reconstruct a reference frame from compressed reference video data. The compression decoder also includes a RNN trained by output data of the reference CNN. The compression decoder also includes a remaining CNN adapted to reconstruct a set of remaining frames from compressed remaining video data using the RNN.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
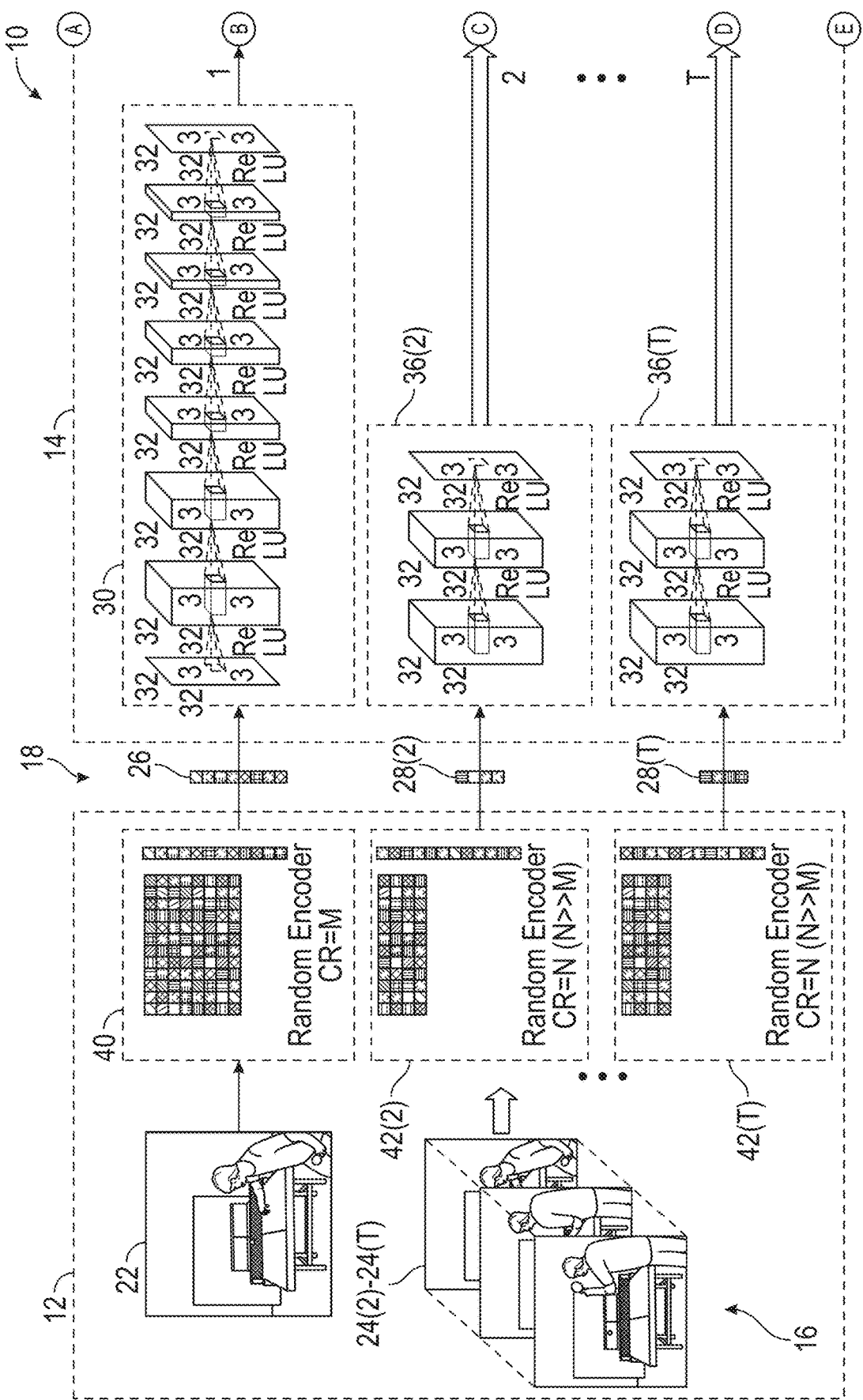
FIGS. 1A and 1B depict an exemplary embodiment of a video processing system which incorporates a real time end-to-end learning system for a high frame rate video compressive sensing network (referred to herein as CSVideoNet).

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the present disclosure relate to a real time end-to-end learning system for a high frame rate video compressive sensing network. In this regard, the slow reconstruction speed of conventional compressive sensing (CS) approaches is overcome by embodiments of the disclosure by directly modeling an inverse mapping from compressed domain to original domain. Usually, this mapping would be complicated and difficult to model. However, through processing massive unlabeled video data such a mapping can be learned by a neural network using data-driven methods. Systems and methods according to this disclosure incorporate an enhanced recurrent convolutional neural network (RCNN) to solve this problem. RCNN has shown astonishingly good performance for video recognition and description. However, conventional RCNNs are not well suited for CS video applications, since they are mostly designed to extract discriminant features for classification related tasks. Simultaneously improving compression ratio (CR) and preserving visual details for high-fidelity reconstruction is a more challenging task.

Embodiments disclosed herein incorporate a special RCNN to extract spatial-temporal features to significantly improve the compression ratio and recovery quality trade-off for video CS application over existing approaches. Example spatial-temporal features which may be extracted include background, object details, and motions. A real-time end-to-end learning system for high frame rate video compressive sensing network (referred to herein as CSVideoNet) is described herein. CSVideoNet includes a non-iterative model that directly learns the inverse mapping of video data which is compressed, transmitted to a destination, and then reconstructed into near-original video data in a single forward propagation. A multi-rate convolutional neural network (CNN) and a synthesizing recurrent neural network (RNN) are used to improve the trade-off between CR and spatial-temporal resolution of the reconstructed videos.

Figure 1B:
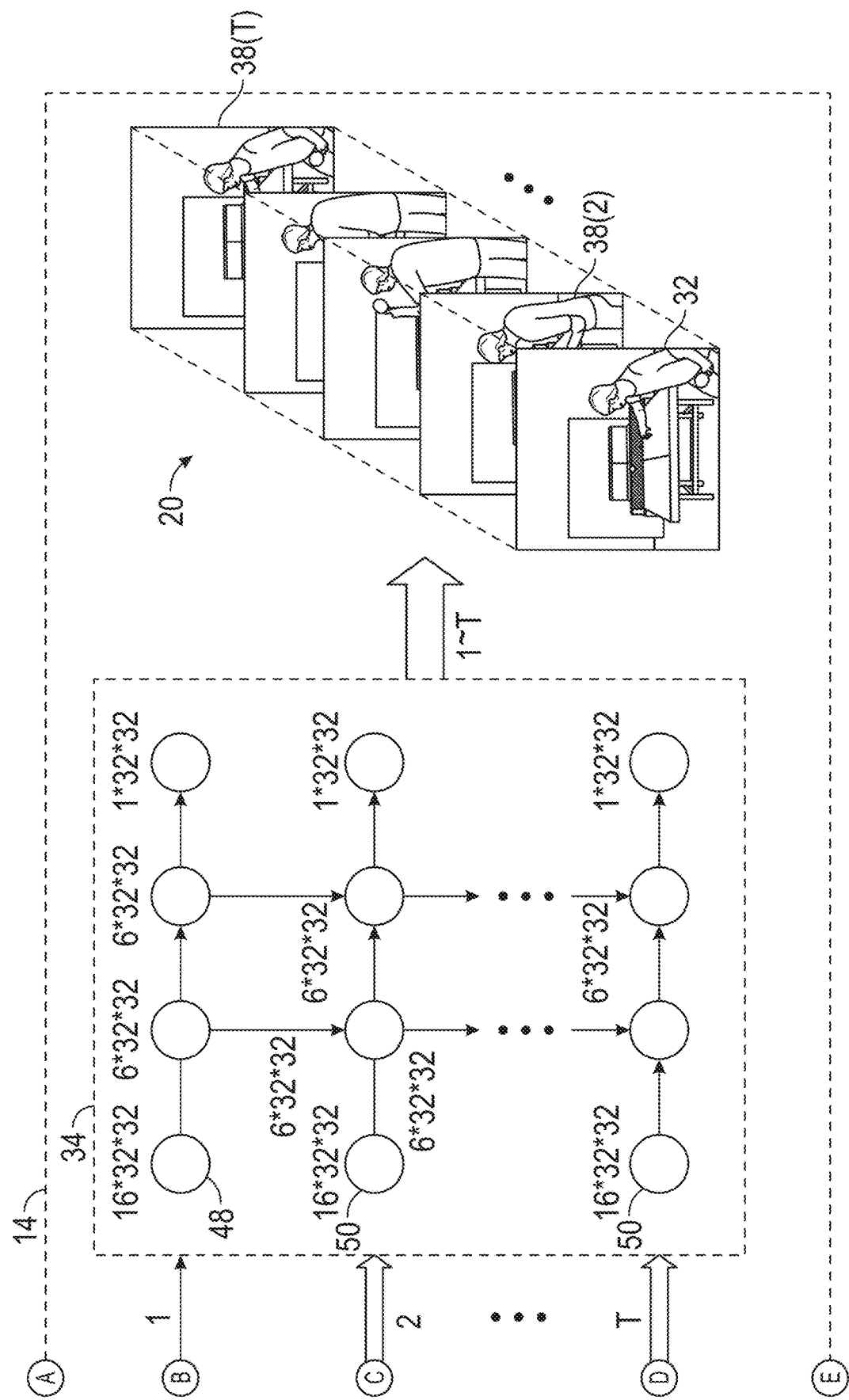

FIGS. 1A and 1B depict an exemplary embodiment of a video processing system 10 which incorporates a real time end-to-end learning system for a high frame rate video compressive sensing network (e.g., CSVideoNet). The video processing system 10 includes a compression encoder 12 and a compression decoder 14. The compression encoder 12 simultaneously senses and compresses a group of pictures 16 to produce compressed video data 18. The compression decoder 14 (e.g., video reconstruction network) then receives and reconstructs the compressed video data 18 to produce a reconstructed group of pictures 20.

In further detail, the video processing system 10 improves the trade-off between CR and spatial-temporal resolution over existing systems and methods. There are currently two main types of CS imaging systems in use. Spatial multiplexing cameras (SMC) take significantly fewer measurements than the number of pixels in a scene to be recovered. SMC has low spatial resolution and seeks to spatially super-resolve videos. In contrast, temporal multiplexing cameras (TMC) have high spatial resolution but low framerate sensors. Due to missing intermediate frames in TMC, extra computation is needed for motion estimation. For these two imaging systems, either spatial or temporal resolution is sacrificed for achieving a better spatial-temporal trade-off. Embodiments of the present disclosure incorporate the video processing system 10 to improve the spatial-temporal trade-off by deploying the new compression encoder 12 and compression decoder 14 which combine the advantages of SMC and TMC.

The compression encoder 12 collects random video measurements of the group of pictures 16 in a manner similar to SMC, with very high temporal resolution. To compensate for lower spatial resolution of a traditional SMC approach, embodiments of the compression encoder 12 use a multi-CR strategy. The compression encoder 12 may be incorporated in a CS imaging device, such as a camera, mobile device, computer, and so on. The compression encoder 12 compresses one or more reference frames (e.g., key frames) 22 in the group of pictures 16 with a lower CR (e.g., a first CR), and one or more sets of remaining frames (e.g., non-key frames) 24(2)-24(T) with a higher CR (e.g., a second CR, which may be 5×-100× the first CR of the reference frame(s)). Because there is a high inter-frame correlation in high frame rate videos, the spatial features in the reference frame(s) are reused for the recovery of the entire group of pictures 16, improving the spatial resolution of the reconstructed group of pictures 20. In some examples, the group of pictures 16 may be a video sequence of length T which is part of a larger video file, such that multiple groups of pictures 16 are sequentially processed by the video processing system 10. In such examples, each group of pictures 16 processed by the video processing system 10 may include a reference frame 22 (e.g., a first reference frame, a second reference frame, etc.) and a set of remaining frames 24(2)-24(T) (e.g., a first set of remaining frames, a second set of remaining frames, etc.).

As depicted in FIGS. 1A and 1B, the compression decoder 14 receives the compressed video data 18, which includes compressed reference video data 26 based on a lower CR encoding of the reference frame 22. The compressed video data 18 also includes compressed remaining video data 28(2)-28(T) based on a higher CR encoding of the set of remaining frames 24(2)-24(T). The compression decoder 14 may be incorporated in a storage device, a transmission medium, a display device, and additional end video devices. The spatial features in the reference frame 22 may be transmitted to the compression decoder 14 and used to decompress and reconstruct the entire group of pictures 16.

In an exemplary aspect, the compressed reference video data 26 is processed by an eight-layer multi-rate CNN (e.g., a reference CNN 30). An output of the reference CNN 30 (e.g., a decompressed and reconstructed reference frame 32) is used to train a synthesizing RNN 34. In some examples, the compressed reference video data 26 is processed by the reference CNN 30 to extract spatial visual feature data for the reconstructed group of pictures 20 and to provide training data to the synthesizing RNN 34. In addition, the decompressed and reconstructed reference frame 32 can be included in the reconstructed group of pictures 20.

The compressed remaining video data 28(2)-28(T) is processed by one or more three-layer multi-rate CNNs (e.g., remaining CNNs 36(2)-36(T)). An output of the remaining CNNs 36(2)-36(T) (e.g., the decompressed and reconstructed set of remaining frames) may not be a completely reconstructed sequence of the set of remaining frames 24(2)-24(T). Therefore, the output of the remaining CNNs 36(2)-36(T) is further enhanced with temporal features using the trained synthesizing RNN 34. Enhanced decompressed remaining frames 38(2)-38(T) are produced by the trained synthesizing RNN 34 and included in the reconstructed group of pictures 20. The synthesizing RNN 34 extrapolates motion from the high-resolution compressed reference video data 26 and uses the extrapolated motion to improve the temporal resolution of the compressed remaining video data 28(2)-28(T). Therefore, a better CR and spatial-temporal resolution trade-off are obtained by embodiments of the present disclosure (e.g., CSVideoNet).

As described above, the compression encoder 12 collects random video measurements of the group of pictures 16 and produces the compressed reference video data 26 and the compressed remaining video data 28(2)-28(T). In an exemplary aspect, the compression encoder 12 employs a multi-CR strategy. Thus, the compression encoder 12 can include a low-CR random encoder 40 and one or more high-CR random encoders 42(2)-42(T). In this manner, the low-CR random encoder 40 encodes the reference frame 22 in the group of pictures 16 with more measurements, and the high-CR random encoders 42(2)-42(T) encode the set of remaining frames 24(2)-24(T) with fewer measurements. It should be understood that the low-CR random encoder 40 and the high-CR random encoders 42(2)-42(T) can be implemented in an adaptable random encoder.

The random encoder(s) 40, 42(2)-42(T) can use an appropriate sensing matrix, such as a random Bernoulli matrix or Gaussian matrix for information encoding. In addition, the sensing matrix of the random encoder(s) 40, 42(2)-42(T) can be trained with raw data to better preserve the restricted isometry property (RIP). Therefore, in some examples the compression encoder 12 can be integrated with the compression decoder 14 and trained with the whole network to improve reconstruction performance. In addition, reconstruction loss can be used to train the sensing matrix of the random encoder(s) 40, 42(2)-42(T) along with the model. In an exemplary aspect, the synthesizing RNN 34 infers motion from the high-resolution decompressed and reconstructed reference frame 32 (e.g., based on the compressed reference video data 26) generated by the reference CNN 30. Thus, the resolution of the reconstructed video (e.g., the reconstructed group of pictures 20) is further improved with the incorporation of high quality motion estimation.

Figure 2:
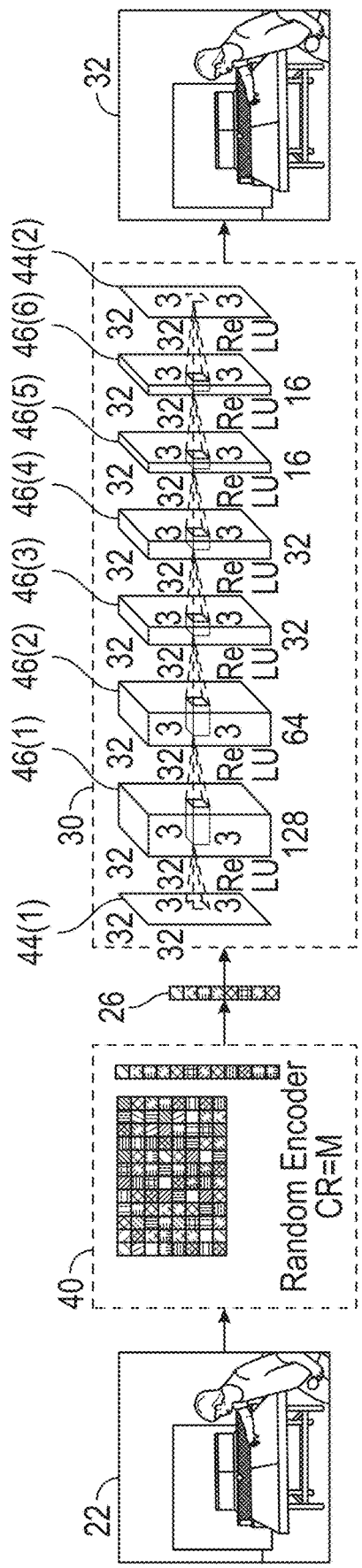
FIG. 2 depicts use of an exemplary eight stage multi-rate reference convolutional neural network (CNN) to create training data used by a synthesizing recurrent neural network (RNN) of the exemplary video processing system depicted in FIGS. 1A and 1B.

FIG. 2 depicts use of an exemplary eight-layer multi-rate reference CNN 30 to create training data used by the synthesizing RNN 34 of the exemplary video processing system 10 depicted in FIGS. 1A and 1B. In this regard, the reference CNN 30 receives the compressed reference video data 26, from which the reference CNN 30 extracts spatial visual features and preserves details in the reference frame 22. The exemplary embodiment depicted in FIG. 2 eliminates the pooling layer which causes information loss in a traditional CNN. In addition, the convolution-deconvolution architecture is eliminated, which first encodes salient visual features into low-dimension space and then interpolates the missing information to generate a high-resolution image. Instead, the compression decoder 14 includes a special CNN (e.g., the reference CNN 30) suitable for CS reconstruction with improved performance over existing approaches.

In this regard, the reference CNN 30 implements a mapping process in which all feature maps have the same size as the decompressed and reconstructed reference frame 32, and the number of feature maps decreases monotonically. This process resembles the sparse coding stage in CS, where a subset of dictionary atoms is combined to form the estimation of the original input. The reference CNN 30 includes one or more fully connected (FC) layers 44(1), 44(2), which convert between m-dimensional video data (e.g., compressed reference video data 26, a decompressed and reconstructed reference frame 32) and two-dimensional (2D) features maps. In the exemplary reference CNN 30 of FIG. 2, additional convolutional layers 46(1)-46(6) include a video block with a block size n. Each of the FC layers 44(1), 44(2) and the convolutional layers 46(1)-46(6) is followed by a rectified linear unit (ReLU) layer, with the exception of the final layer (e.g., FC layer 44(2)). This approach reduces the latency of the video processing system and simplifies the network architecture.

The exemplary reference CNN 30 is an eight-layer CNN for processing the low-CR compressed reference video data 26. The remaining CNNs 36(2)-36(T) of FIGS. 1A and 1B similarly process the higher-CR compressed remaining video data 28(2)-28(T). In an exemplary aspect, the remaining CNNs 36(2)-36(T) are three-layer multi-rate CNNs, which may be sufficient to process the compressed remaining video data 28(2)-28(T) carrying low entropy information. It should be understood, however, that the use of an eight-layer CNN for the reference CNN 30 and a three-layer CNN for the remaining CNNs 36(2)-36(T) is exemplary in nature, and other numbers of layers may also be used.

In an exemplary aspect, the eight-layer reference CNN 30 is pre-trained using a video database. For example, the block size n of the FC layers 44(1), 44(2) and the convolutional layers 46(1)-46(6) can be set to 32×32. During the pre-training, the reference CNN 30 is pre-trained for processing the reference frame 22 in the group of pictures 16, which is compressed with a low CR. In some examples, the weights of the remaining CNNs 36(2)-36(T) are shared to reduce storage requirements. This allows for the exemplary video processing system 10 of FIGS. 1A and 1B to be generalized for other high frame rate video applications that require a larger number of remaining frames in a set of remaining frames 24(2)-24(T). The pre-training of the reference CNN 30 improves reconstruction performance, but other embodiments may not pre-train the reference CNN 30.

With reference to FIGS. 1A, 1B, and 2, the synthesizing RNN 34 improves performance of the video processing system 10 by performing motion estimation implicitly. In an exemplary aspect, the synthesizing RNN 34 includes a long short-term memory (LSTM) network to extract motion features that improve temporal resolution from an output of the reference CNN 30 (e.g., the decompressed and reconstructed reference frame 32). Information flows from a first LSTM node 48 to other LSTM nodes 50. In this manner, the LSTM network of the synthesizing RNN 34 infers representations for hidden motion from the decompressed and reconstructed reference frame 32 to the reconstructed remaining frames 38(2)-38(T). Therefore, the reconstructed group of pictures 20 is improved by the aggregation of motion and spatial visual features to be a higher quality reconstruction of the original group of pictures 16. Thus, the LSTM network of the synthesizing RNN 34 can also be referred to as a motion-estimation synthesizing LSTM.

In an exemplary aspect, each input LSTM node 48, 50 accepts input data with equal length for simplicity. However, since each frame of the compressed remaining video data 28(2)-28(T) carries less information than the reference video data 26, the LSTM network can be designed to accept inputs with variable lengths. Hence, the model size can be reduced and have a faster reconstruction speed.

In an example embodiment, the update of the LSTM nodes 48, 50 is as follows:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t)$$

where $x_t$ is the visual feature output of the reference CNN 30. An exemplary information flow and output dimension of each LSTM node 48, 50 is further illustrated in FIG. 1B. In further detail, the output feature map of each CNN 30, 36(2)-36(T) has a dimension of 16×32×32, and is directly fed into the input LSTM nodes 48, 50. The LSTM network has two hidden layers, each with an output dimension of 6×32×32. The final output dimension is 1×32×32. It should be understood that these dimensions are exemplary in nature and other embodiments may have different output dimensions.

The compression decoder 14 (e.g., video reconstruction network) in the exemplary video processing system 10 may be trained using a variety of learning algorithms, such as stochastic gradient descent (SGD), Adagrad, adaptive moment estimation (Adam), or other algorithms. A mean square error (MSE) can be employed as a loss function, with ground-truth video frames represented as $x_{\{1,\ldots,T\}}$ and the corresponding compressed frames $y_{\{1,\ldots,T\}}$. The MSE is defined as:

$$L(W, b) = \frac{1}{2N} \sum_{i}^{T} \|f(y_i; W, b) - x_i\|_2^2$$

where W, b are network weights and biases, respectively.

Using the MSE as the loss function favors high peak signal to noise ratio (PSNR), indicating high recovery quality. In other examples, another loss function may be used. It should be understood that other training algorithms may be used. In an exemplary aspect, a stochastic method converges toward better reconstruction results.

FIGS. 3A-5C depict example reconstructed frames for the exemplary video processing system 10 of FIGS. 1A and 1B and comparisons with other CS reconstruction approaches. There is no widely accepted standard dataset designed for video CS, but a benchmark dataset, UCF101 from the University of Central Florida Center for Research in Computer Vision, has been used to benchmark the exemplary video processing system 10 (e.g., CSVideoNet). The UCF101 dataset consists of 13,000 clips and 27 hours of video recording data collected from YouTube, with the clips being categorized in 101 action classes. Videos in the dataset have a resolution of 320×240 and are sampled at 25 frames per second (fps). For the reconstructed frames and comparisons of FIGS. 3A-5C, only the luminance component of the extracted frames is trained and the central 160×160 patch from each frame is cropped. These patches are then segmented into 32×32 non-overlapping image blocks. This provides 499,760 groups of pictures 16 for training and testing in total.

For FIGS. 3A-5C, three test cases are set with three CRs of 25, 50 and 100, respectively. Since the CR for reference frames 22 and remaining sets of frames 24(2)-24(T) are different in the video processing system 10, the average CR can be derived. For example, where $m_1$ denotes the dimension of a compressed reference frame 22, $m_2$ denotes the dimension of compressed remaining frames 24(2)-24(T), n denotes the dimension of raw frames, and T is the sequential length of the group of pictures 16, the CR can be derived as follows:

$$CR_1 = \frac{n}{m_1}$$

$$CR_2 = \frac{n}{m_2}$$

$$CR = \frac{CR_1 \times 1 + CR_2 \times (T-1)}{T}$$

For the test cases, the CR of each reference frame 22 is $m_1=5$ and the CR of the remaining frames 24(1)-24(T) is $m_2=27$, $m_2=55$, and $m_2=100$, respectively. Therefore, the averaged CR for each test case is approximately 25, 50, and 100, respectively.

The dimension of data for pre-training the reference CNN 30 is (N×C×H×W), where N=100 is the batch size, C=1 is the channel size, H=32 is the height, and W=32 is the width of each image block. The dimension of the data used for training the entire model is (N×T×C×H×W), where T=10 is the sequence length for one group of pictures 16, and N=20 is the batch size. The other dimensions are the same. It should be noted that the batch size is exemplary in natures, and a larger batch size may be used but may consume additional memory of processing hardware. For this example, in every 10 consecutive video frames of a given video clip, the first frame is defined as the reference frame 22, and the other frames are defined as the remaining frames 24(2)-24(T).

For FIGS. 3A-5C, the exemplary video processing system 10 (e.g., CSVideoNet) is compared with six reference approaches (described in the Background section above) using the same dataset. The baseline approaches are summarized in Table 1 below:

TABLE 1

| Image CS | Iterative Based | Denoising-based approximate message passing | D-AMP |
|---|---|---|---|
| | Non-Iterative Based | Stacked denoising autoencoder | SDA |
| | | Convolutional neural network | ReconNet |

TABLE 1-continued

| Video CS | Iterative Based | Motion-compensated block-based CS with smooth projected Landweber | MC-BCS-SPL |
| --- | --- | --- | --- |
| | Non-Iterative Based | Gaussian mixture model Fully-connected neural network Proposed approach | GMM VCSNet CSVideoNet |

Figure 3A:
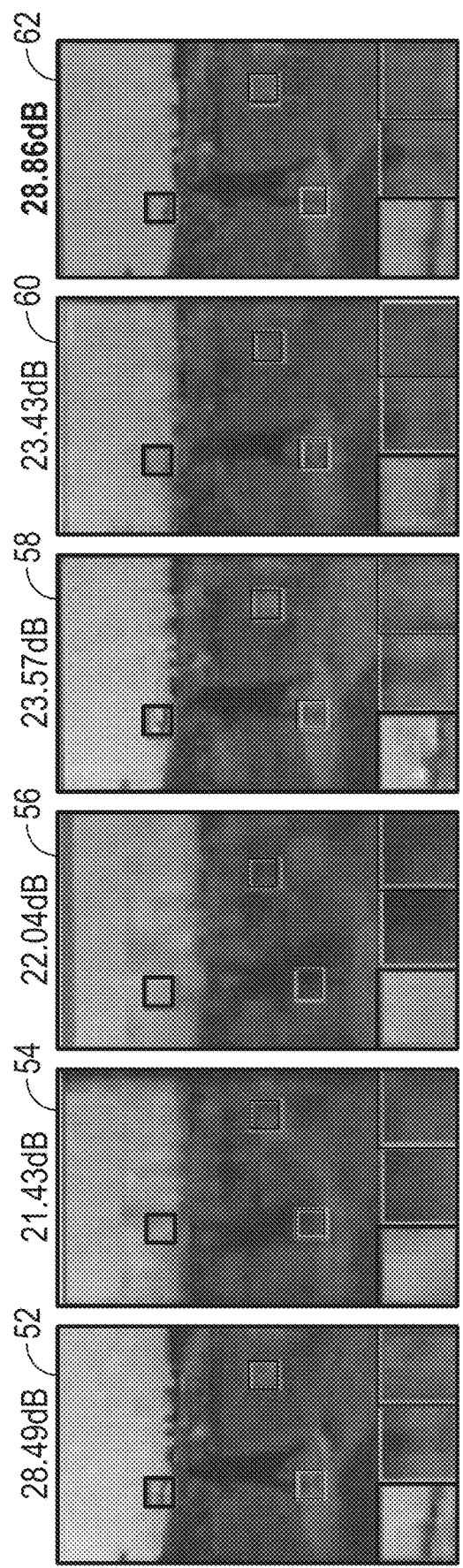
FIGS. 3A-3C depict reconstructed frames for several reference reconstruction approaches, along with reconstructed frames of the exemplary video processing system of FIGS. 1A and 1B.
Figure 3B:
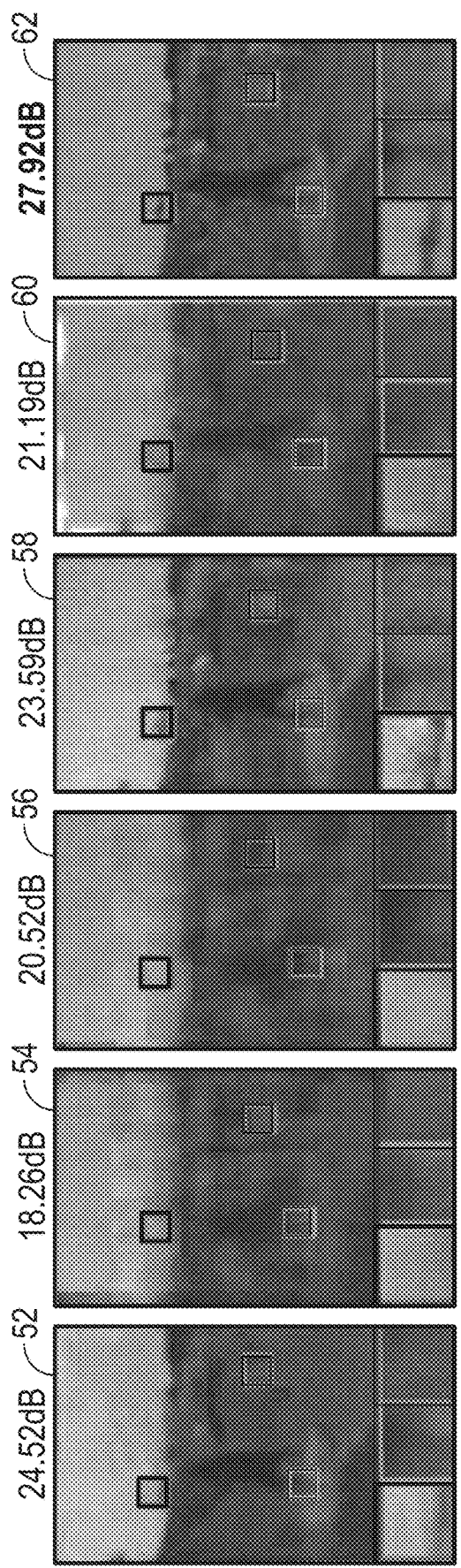
Figure 3C:
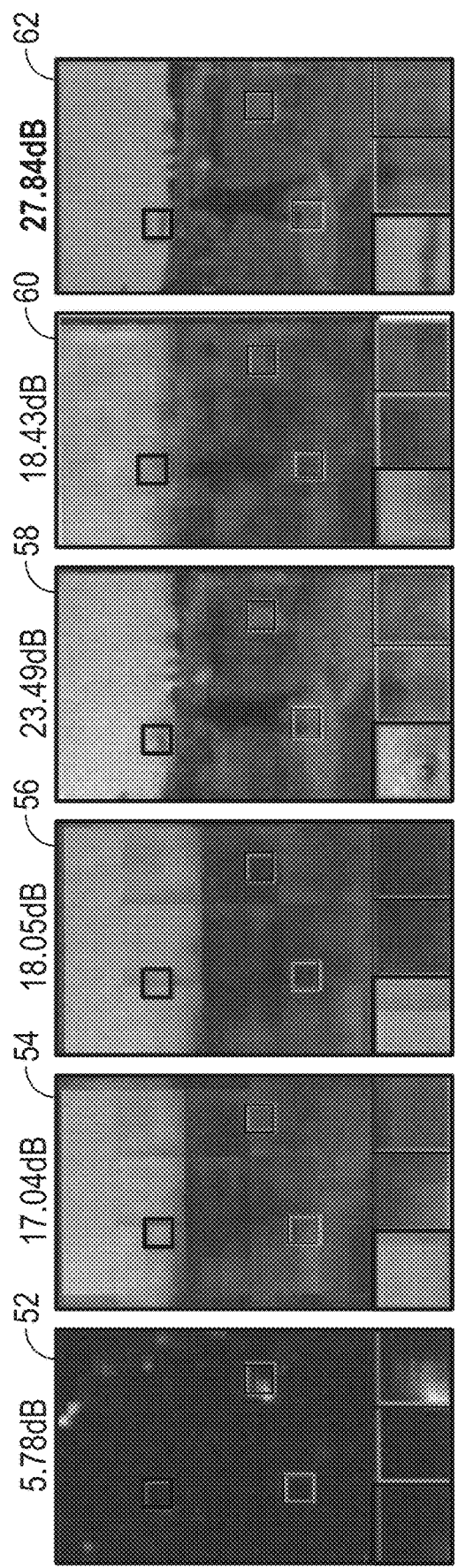

FIGS. 3A-3C depict reconstructed frames for several reference reconstruction approaches of Table 1, along with reconstructed frames of the exemplary video processing system 10 of FIGS. 1A and 1B. Each of FIGS. 3A-3C depicts reconstructed frames 52, 54, 56, 58, 60, 62 for D-AMP, SDA, ReconNet, MC-BCS-SPL, GMM, and the exemplary video processing system 10 (e.g., CSVideoNet) reconstruction approaches, respectively. FIG. 3A depicts the reconstructed frames 52, 54, 56, 58, 60, 62 at a CR of 25. FIG. 3B depicts the reconstructed frames 52, 54, 56, 58, 60, 62 at a CR of 50. FIG. 3C depicts the reconstructed frames 52, 54, 56, 58, 60, 62 at a CR of 100.

The reconstructed frame 62 for the exemplary video processing system 10 (e.g., CSVideoNet) depicted in FIGS. 3A-3C is the middle (e.g., fifth) frame in a group of pictures 16. For the exemplary video processing system 10 (e.g., CSVideoNet), the enhanced decompressed remaining frames 38(2)-38(T) may have similar recovery quality, and the decompressed and reconstructed reference frame 32 may have slightly better reconstruction quality. Since the proportion of reference frames to remaining frames is 1:9, the reconstruction quality is dominated by the quality of the remaining frames. Therefore, the middle frame shown in FIGS. 3A-3C represents the average reconstruction quality for the reconstructed group of pictures 20.

Results of the exemplary video processing system 10 (e.g., CSVideoNet) are compared with the CS reconstruction approaches of Table 1. The comparison includes average PSNR, structural similarity (SSIM), and pixel-wise mean absolute error (MAE) for each approach under different CRs. Table 2 below compares CSVideoNet results with the algorithms used for image CS reconstruction. D-AMP is a representative of the conventional iterative algorithms developed for CS, e.g., matching pursuit, orthogonal mating pursuit, iterative hard thresholding. D-AMP is considered to offer state-of-the-art recovery performance and operates tens of times faster compared to other iterative methods. Both SDA and ReconNet are recently developed deep neural network (DNN)-based reconstruction approaches for images. ReconNet is based on a CNN model and is considered to have state-of-the-art performance among image CS reconstruction algorithms. Both frame-based and block-based D-AMP were tested, which reconstructs the entire frame and an image block at a time, respectively. Other approaches are tested in a block-based pattern since it offers much higher throughput.

TABLE 2

| | CR | D-AMP(F) | D-AMP(B) | SDA | ReconNet | CSVideoNet |
| --- | --- | --- | --- | --- | --- | --- |
| PSNR | 25 | 25.34 | 15.1494 | 23.39 | 24.27 | 26.87 |
| | 50 | 12.49 | 9.1719 | 21.96 | 22.47 | 25.09 |
| | 100 | 7.17 | 8.0942 | 20.40 | 20.44 | 24.23 |
| SSIM | 25 | 0.76 | 0.0934 | 0.69 | 0.73 | 0.81 |
| | 50 | 0.08 | 0.0249 | 0.65 | 0.67 | 0.77 |
| | 100 | 0.03 | 0.0067 | 0.61 | 0.61 | 0.74 |
| MAE | 25 | 4.65 | 24.92 | 5.76 | 5.02 | 3.38 |
| | 50 | 64.30 | 81.67 | 6.60 | 5.67 | 4.31 |
| | 100 | 92.12 | 86.04 | 8.50 | 7.42 | 4.59 |
| PSNR↓ | 25→100 | 72% | 13% | 47% | 16% | 10% |

As shown in Table 2, CSVideoNet outperforms the reference approaches on all three metrics of PSNR, SSIM, and MAE by a meaningful margin, especially at the CR of 100. The MAE of CSVideoNet is 4.59 at a CR of 100, which means the averaged pixel-wise distortion is only 4.59/255=1.2% compared to the ground-truth video. The PSNR drop from the CR of 25 to 100 is also calculated. The exemplary video processing system 10 (e.g., CSVideoNet) suffers from the least performance degradation compared to the reference image CS reconstruction algorithms. This performance may be due to the feature sharing between the compressed reference video data 26 and the compressed remaining video data 28(2)-28(T).

Table 3 below compares CSVideoNet results with the algorithms used for video CS reconstruction in Table 1. MC-BCS-SPL estimates motion directly from the current and the reference frame. GMM models the spatial-temporal correlation by assuming all pixels within a video patch are drawn from a GMM distribution. GMM is considered to have the state-of-the-art performance among conventional model-based video CS approaches.

TABLE 3

| | CR | MC-BCS-SPL | GMM | CSVideoNet |
| --- | --- | --- | --- | --- |
| PSNR | 25 | 22.41 | 23.76 | 26.87 |
| | 50 | 20.59 | 21.26 | 25.09 |
| | 100 | 19.67 | 19.64 | 24.23 |
| SSIM | 25 | 0.37 | 0.72 | 0.81 |
| | 50 | 0.30 | 0.61 | 0.77 |
| | 100 | 0.19 | 0.54 | 0.74 |
| MAE | 25 | 11.88 | 5.14 | 3.38 |
| | 50 | 16.03 | 7.50 | 4.31 |
| | 100 | 28.86 | 9.37 | 4.59 |
| PSNR↓ | 25→100 | 26% | 17% | 10% |

As shown in Table 3, CSVideoNet improves PSNR by 3 to 5 decibels (dB) over the reference methods. Specifically, MCBCS-SPL and GMM appear to have similar performance and perform much better than the model-based image CS approach, D-AMP. However, the performance of these approaches is similar to SDA and ReconNet, which are designed for processing images. This implies that the conventional model based methods suffer from limited performance due to the limited model capacity when dealing with large-scale reconstruction. Even though these model-based approaches consider the temporal correlation among video frames, the model capacity is insufficient for visual patterns. To improve performance, one could increase the size of the conventional models. However, the computational complexity for these methods would also increase substantially, inhibiting their application to video CS. Therefore, a DNN video CS approach may be viable.

Figure 4:
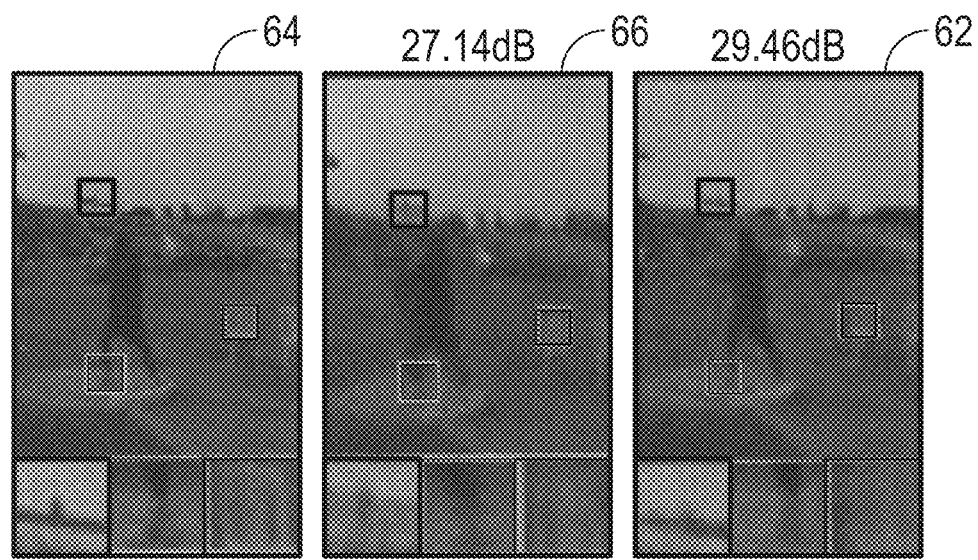
FIG. 4 depicts a comparison between another reference reconstruction approach and the exemplary video processing system of FIGS. 1A and 1B.

FIG. 4 depicts a comparison between another reference reconstruction approach and the exemplary video processing system 10 (e.g., CSVideoNet) of FIGS. 1A and 1B. FIG. 4 depicts a ground truth frame 64, a reconstructed frame 66 for VCSNet, and the reconstructed frame 62 for the exemplary video processing system 10 (e.g., CSVideoNet). Both CSVideoNet and VCSNet are DNNs that are designed for video CS reconstruction. FIG. 4 compares the two approaches at a CR of 16. Both the two approaches achieve high recovery quality compared to other baselines. However, VCSNet is a plain fully-connect network that has limited capability for processing sequential data. As a result, it suffers from a low quality motion estimation, which explains why it has inferior performance compared to the proposed solution. Quantitative results of the exemplary video processing system 10 are compared with VCSNet in Table 4 below.

TABLE 4

|  | VCSNet | CSVideoNet |
| --- | --- | --- |
| PSNR | 25.07704 | 28.078 |
| SSIM | 0.817669 | 0.8431 |
| MAE | 3.887867 | 2.9452 |

Figure 5A:
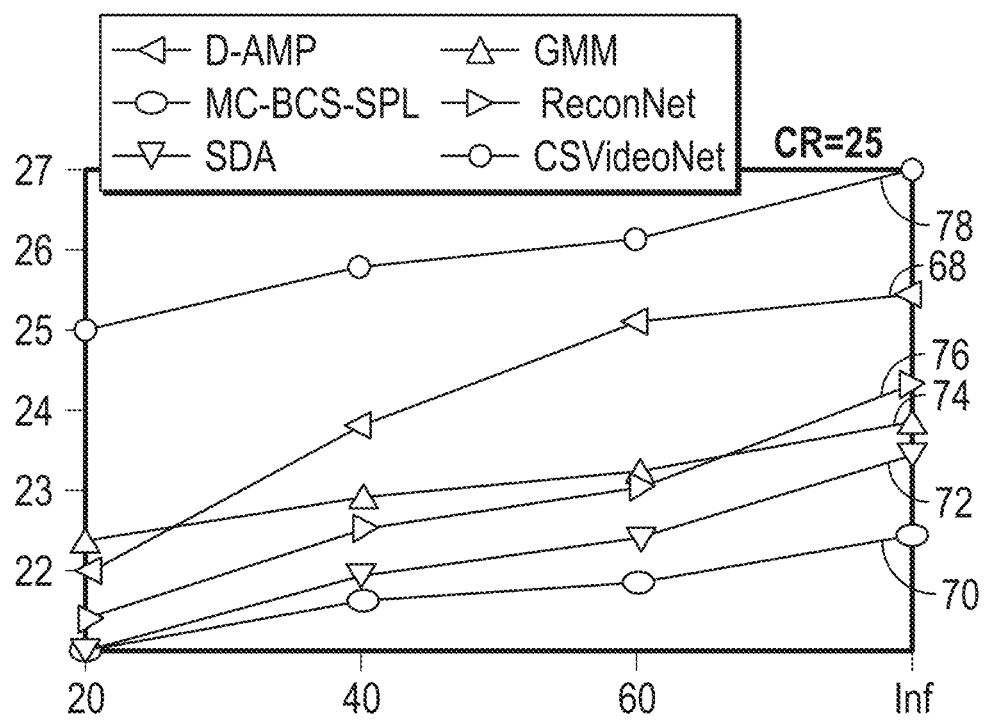
FIGS. 5A-5C depict a comparison of a noise response of several reference reconstruction approaches and the exemplary video processing system of FIGS. 1A and 1B.
Figure 5B:
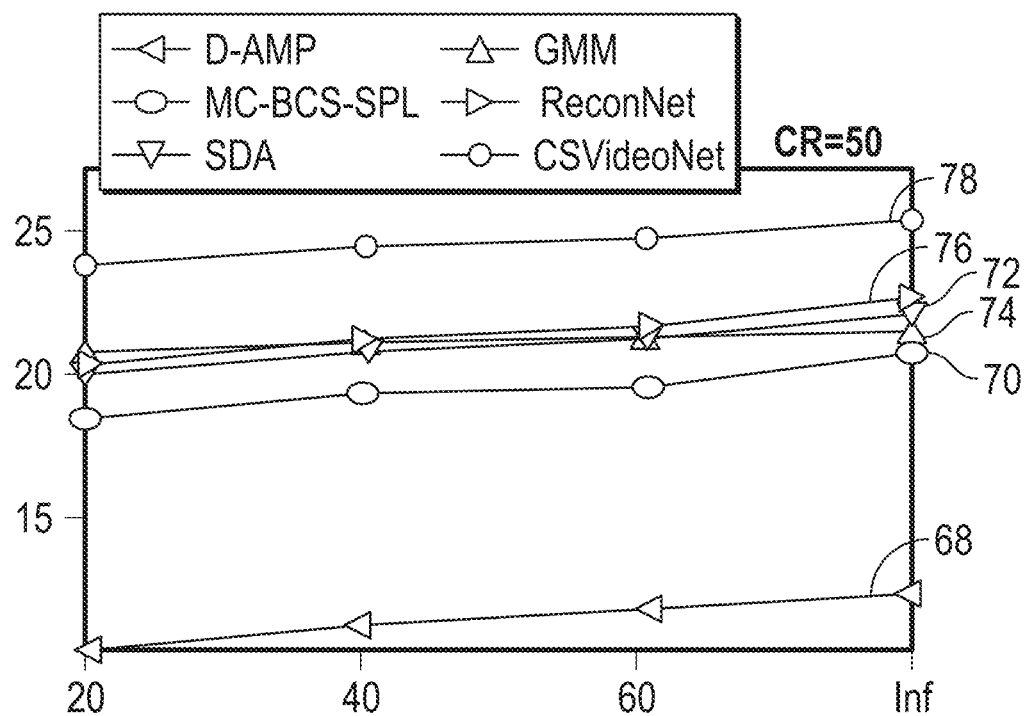
Figure 5C:
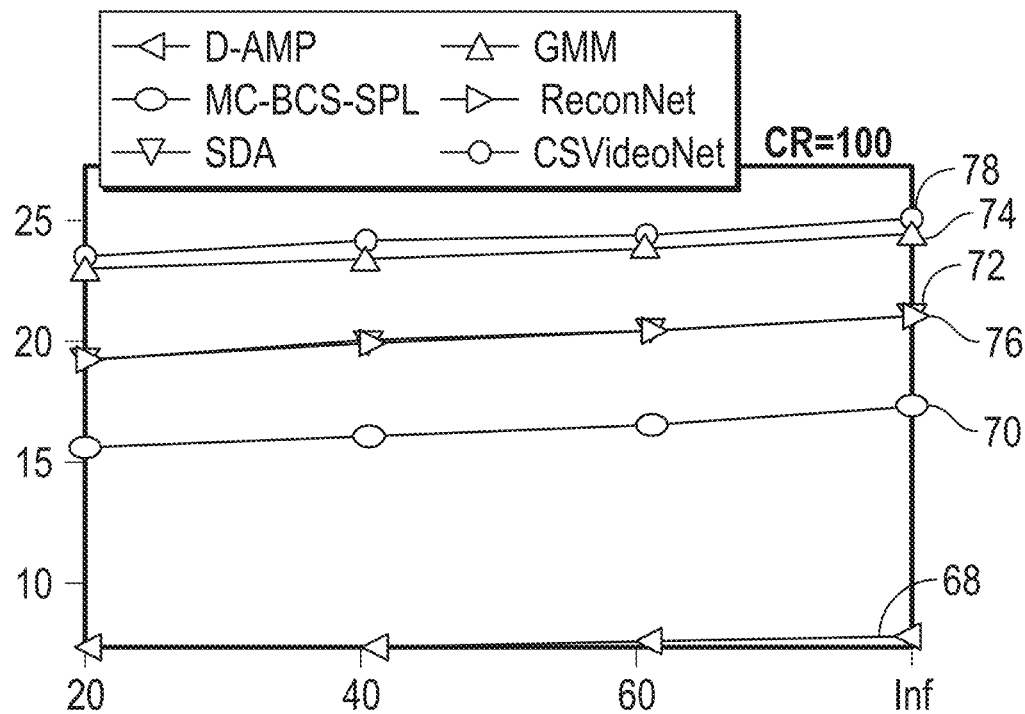

FIGS. 5A-5C depict a comparison of a noise response of several reference reconstruction approaches and the exemplary video processing system 10 of FIGS. 1A and 1B. To demonstrate the robustness of the exemplary video processing system 10 (e.g., CSVideoNet) to sensor noise, a reconstruction is conducted with input videos contaminated by random Gaussian noise. Each of FIGS. 5A-5C depict noise performance of D-AMP 68, MC-BCS-SPL 70, SDA 72, GMM 74, ReconNet 76, and CSVideoNet 78 at three levels of signal-to-noise ratio (SNR)—20 dB, 40 dB, and 60 dB. FIG. 5A depicts the average PSNR of each approach at a CR of 25. FIG. 5B depicts the average PSNR of each approach at a CR of 50. FIG. 5C depicts the average PSNR of each approach at a CR of 100. CSVideoNet can thus reliably achieve a high PSNR across different noise levels and outperform the reference approaches consistently.

Table 5 below benchmarks the runtime performance of several reference reconstruction approaches and the exemplary video processing system 10 of FIGS. 1A and 1B (e.g., CSVideoNet). Due to the iterative nature of conventional CS algorithms (D-AMP, MC-BCS-SPL, GMM), they suffer from high data-dependency and low parallelism, which is not suitable for GPU acceleration. Due to the lack of GPU solvers for these algorithms, these reference algorithms were executed on an octa-core Intel Xeon E5-2600 CPU. Benefiting from the feedforward data-path and high data concurrency of DNN-based approaches, CSVideoNet and other DNN-based baselines were accelerated using an Nvidia GTX Titan X GPU. Table 5 compares the time cost (in seconds) for fully reconstructing a video frame in the size of (160×160):

TABLE 5

| Model | CR = 25 | CR = 50 | CR = 100 |
| --- | --- | --- | --- |
| D-AMP(F) | 38.37 | 41.20 | 31.74 |
| D-AMP(B) | 8.4652 | 8.5498 | 8.4433 |
| SDA | 0.0278 | 0.027 | 0.023 |
| ReconNet | 0.064 | 0.063 | 0.061 |
| MC-BCS | 7.17 | 8.03 | 9.00 |
| GMM | 8.87 | 10.54 | 18.34 |
| CSVideoNet | 0.0094 | 0.0085 | 0.0080 |

As shown in Table 5, CSVideoNet consumes 8 milliseconds (125 fps) to reconstruct a frame at the CR of 100. This is three orders of magnitude faster than the reference methods based on iterative approaches. The time cost of VCSNet and CSVideoNet at the CR of 16 is 3.5 and 9.7 milliseconds, respectively. Through further hardware optimization, other embodiments of CSVideoNet can be integrated into CS cameras to enable the real-time reconstruction of high frame rate video CS.

Figure 6:
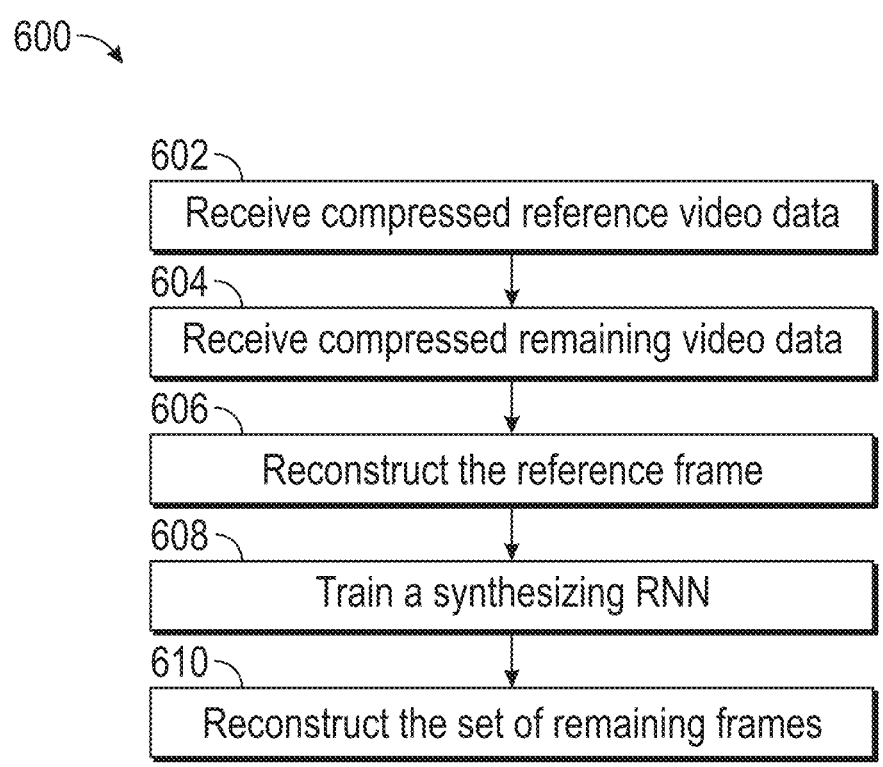
FIG. 6 depicts an exemplary process for reconstructing compressed video data.

FIG. 6 depicts an exemplary process 600 for reconstructing compressed video data. The process can be implemented using the video processing system 10 described above with respect to FIGS. 1A-5C. The process 600 includes the operation of receiving compressed reference video data based on a reference frame (block 602). The process 600 also includes receiving compressed remaining video data based on a set of remaining frames (block 604). It should be understood that receiving the compressed reference video data and the compressed remaining video data can occur simultaneously or sequentially. The reference frame is reconstructed from the compressed reference video data using a reference CNN (block 606). A synthesizing RNN is trained using output data from the reference CNN (block 608). In addition, the set of remaining frames is reconstructed from the compressed remaining video data using a remaining CNN and the synthesizing RNN (block 610).

It should be understood that the functions and processes described herein may be implemented with a processor (e.g., a CPU or GPU), a digital signal processor (DSP), an application specific integrated circuit (ASIC), a field programmable gate array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Those skilled in the art will recognize improvements and modifications to the preferred embodiments of the present disclosure. All such improvements and modifications are considered within the scope of the concepts disclosed herein and the claims that follow.

What is claimed is:

1. A method for reconstructing compressive sensing (CS) video data, comprising:
  receiving CS reference video data based on a reference frame;
  receiving CS remaining video data based on a set of remaining frames;

reconstructing the reference frame from the CS reference video data using a reference convolutional neural network (CNN);
training a synthesizing recurrent neural network (RNN) using output data from the reference CNN; and
reconstructing the set of remaining frames from the CS remaining video data using a remaining CNN and the synthesizing RNN.

2. The method of claim 1, further comprising generating a reconstructed group of pictures from the reconstructed reference frame and the reconstructed set of remaining frames.

3. The method of claim 2, wherein reconstructing the reference frame comprises extracting spatial visual features for the reconstructed group of pictures from the CS reference video data.

4. The method of claim 1, wherein the synthesizing RNN comprises a long short-term memory (LSTM) network.

5. The method of claim 4, wherein reconstructing the set of remaining frames comprises:
processing the CS remaining video data with the remaining CNN to produce decompressed remaining frames; and
enhancing the decompressed remaining frames by the synthesizing RNN.

6. The method of claim 4, wherein:
training the synthesizing RNN comprises extracting motion features from the reconstructed reference frame; and
reconstructing the set of remaining frames comprises:
extracting spatial features from the CS remaining video data with the remaining CNN; and
reconstructing the set of remaining frames using the extracted spatial features from the CS remaining video data and the extracted motion features from the reconstructed reference frame.

7. The method of claim 1, wherein the reference frame of the CS reference video data comprises more measurements than each of the set of remaining frames of the CS remaining video data.

8. The method of claim 1, further comprising simultaneously sampling video data at a sub-Nyquist sampling rate and compressing the video data to generate the CS reference video data and the CS remaining video data.

9. The method of claim 8 wherein simultaneously sampling the video data at the sub-Nyquist sampling rate and compressing the video data comprises:
randomly encoding the reference frame at a first compression ratio (CR);
randomly encoding the set of remaining frames at a second CR which is between 5 and 100 times the first CR.

10. A video reconstruction network, comprising:
a reference convolutional neural network (CNN) adapted to reconstruct a reference frame from compressive sensing (CS) reference video data;
a remaining CNN adapted to partially reconstruct a set of remaining frames from CS remaining video data; and
a synthesizing recurrent neural network (RNN) adapted to enhance the set of remaining frames partially reconstructed by the remaining CNN.

11. The video reconstruction network of claim 10, wherein the reference CNN comprises an eight-layer CNN.

12. The video reconstruction network of claim 11, wherein the remaining CNN comprises a plurality of three-layer CNNs.

13. The video reconstruction network of claim 12, wherein the reference CNN is pre-trained using CS training data from a video database.

14. The video reconstruction network of claim 13, wherein the video reconstruction network is trained using ground truth video frames and at least one of stochastic gradient descent (SGD), Adagrad, or adaptive moment estimation (Adam).

15. The video reconstruction network of claim 10, wherein the synthesizing RNN comprises a long short-term memory (LSTM) network adapted to extract motion features from an output of the reference CNN.

16. A video processing system, comprising:
a sensing (CS) decoder, comprising:
a reference convolutional neural network (CNN) adapted to reconstruct a reference frame from CS reference video data;
a recurrent neural network (RNN) trained by output data of the reference CNN; and
a remaining CNN adapted to reconstruct a set of remaining frames from CS remaining video data using the RNN.

17. The video processing system of claim 16, wherein the RNN is adapted to:
enhance the reconstructed set of remaining frames; and
generate a reconstructed group of pictures from the reconstructed reference frame and the enhanced and reconstructed set of remaining frames.

18. The video processing system of claim 16, further comprising a CS encoder configured to randomly sample the set of remaining frames at a sub-Nyquist sampling rate.

19. The video processing system of claim 18, wherein the CS encoder randomly samples and compresses the reference frame and the set of remaining frames with at least one of a random Bernoulli matrix or a random Gaussian matrix.

20. The video processing system of claim 18, further comprising:
a low compression ratio (CR) random encoder adapted to produce the CS reference video data; and
a high-CR random encoder adapted to produce the CS remaining video data.

* * * * *

UNITED STATES PATENT AND TRADEMARK OFFICE
CERTIFICATE OF CORRECTION

PATENT NO. : 10,924,755 B2  
APPLICATION NO. : 16/165568  
DATED : February 16, 2021  
INVENTOR(S) : Fengbo Ren and Kai Xu It is certified that error appears in the above-identified patent and that said Letters Patent is hereby corrected as shown below:

In the Claims
Claim 16, Column 16, Line 27, replace "a sensing (CS) decoder" with --a compressive sensing (CS) decoder--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*